United States Patent
Sweet

(10) Patent No.: US 11,598,650 B1
(45) Date of Patent: *Mar. 7, 2023

(54) INTEGRATED MULTI-MODE AUTOMATION FOR AIR TRAFFIC CONTROL

(71) Applicant: Architecture Technology Corporation, Minneapolis, MN (US)

(72) Inventor: Douglas Sweet, Campbell, CA (US)

(73) Assignee: ARCHITECTURE TECHNOLOGY CORPORATION, Minneapolis, MN (US)

(*) Notice: Subject to any disclaimer, the term of this patent is extended or adjusted under 35 U.S.C. 154(b) by 167 days.

This patent is subject to a terminal disclaimer.

(21) Appl. No.: 17/112,234

(22) Filed: Dec. 4, 2020

Related U.S. Application Data

(63) Continuation of application No. 15/344,104, filed on Nov. 4, 2016, now Pat. No. 10,859,398.

(51) Int. Cl.
*G01C 23/00* (2006.01)
*G08G 5/00* (2006.01)
*H04L 67/12* (2022.01)
*H04B 7/185* (2006.01)

(52) U.S. Cl.
CPC .......... *G01C 23/00* (2013.01); *G08G 5/0013* (2013.01); *G08G 5/0026* (2013.01); *G08G 5/0082* (2013.01); *G08G 5/0091* (2013.01); *H04B 7/18506* (2013.01); *H04L 67/12* (2013.01)

(58) Field of Classification Search
CPC ............................ H04B 7/18506; H04L 67/12
See application file for complete search history.

(56) References Cited

U.S. PATENT DOCUMENTS

| | | | |
|---|---|---|---|
| 8,942,914 | B2 | 1/2015 | Subbu et al. |
| 9,711,055 | B2 | 7/2017 | Vesely et al. |
| 2008/0046137 | A1 | 2/2008 | Shue |
| 2009/0195436 | A1 | 8/2009 | Ridenour et al. |
| 2012/0215384 | A1 | 8/2012 | Fritz |
| 2012/0215435 | A1 | 8/2012 | Subbu et al. |
| 2013/0085661 | A1 | 4/2013 | Chan et al. |
| 2016/0343257 | A1 | 11/2016 | Kim |

(Continued)

OTHER PUBLICATIONS

Baxley, Brian, Johnson, Will, Swenson, Harry, Robinson, John, Prevot, Tom, Callantine, Todd, Scardina, John, and Greene Michael (NASA). Air Traffic Management Technology Demonstration-1 Concept of Operatiosn (ATD-1 ConOps). NASA. Jul. 2012. Obtained online on Mar. 25, 2019. (Year: 2012).

(Continued)

*Primary Examiner* — Jeffrey C Boomer
(74) *Attorney, Agent, or Firm* — Shumaker & Sieffert P.A.

(57) ABSTRACT

Systems, devices, methods, and techniques are described for automated air traffic management using multiple flight operation modes. In one example, a method includes receiving, by a computing device comprising one or more processors, data associated with one or more aircraft in flight in a controlled airspace. The method further includes selecting, by the computing device, based at least in part on the data associated with the one or more aircraft, a respective flight operation mode from among a plurality of flight operation modes for at least one respective aircraft among the one or more aircraft in flight. The method further includes outputting, by the computing device for transmission to the at least one respective aircraft, an indication of the respective flight operation mode selected for the at least one respective aircraft.

20 Claims, 6 Drawing Sheets

(56) References Cited

U.S. PATENT DOCUMENTS

2016/0358481 A1 12/2016 Vesely et al.
2018/0075756 A1 3/2018 Kirk
2018/0108261 A1 4/2018 Zajac
2018/0130360 A1 5/2018 Sweet

OTHER PUBLICATIONS

Douglas Sweet, Principal Investigator / Project Manager, "Integrated Multi-Mode Automation for Trajectory Based Operations", retrieved from the Internet http://sbir.gsfc.nasa.gov/SBIR/abstracts/16/sbir/phase1/SBIR-16-1-A3.01-8505.htm>, Apr. 26, 2016, 2 pp.
FAA. "Trajectory Based Operations and Verification and Validation",V&V Summit, Sep. 2017. Obtained via https://www.faa.gov/about/office_ org/headquarters_offices/ang/offi ces/tc/library/v&vsummit/v& vsummit2017/presentations/11%20Trajectory%20Based%20Operations%20-%20Pamela%20Whitley.ppsx on Nov. 8, 2018. (Year: 2017).
Prosecution History from U.S. Appl. No. 15/344,104, dated May 2, 2018 through Aug. 12, 2020, 221 pp.

INTEGRATED MULTI-MODE AUTOMATION FOR AIR TRAFFIC CONTROL

This application is a continuation of U.S. patent application Ser. No. 15/344,104, filed Nov. 4, 2016, the entire content of which is incorporated by reference.

STATEMENT REGARDING FEDERALLY SPONSORED RESEARCH OR DEVELOPMENT

This invention was made with Government support under Contract No. NNX16CL56P and Contract No. NNX17CL25C awarded by NASA. The government has certain rights in this invention.

BACKGROUND

Modern aircraft have increasingly sophisticated capabilities for automating flight management based on determination of efficient trajectories that decrease fuel consumption and flight duration. Further types of modern flight management techniques are under development for anticipated introduction. Various types of aircraft in service have a wide range of ages and technological capabilities. Some aircraft are equipped with capabilities for participating in advanced flight management techniques for Trajectory Based Operation (TBO) flight management concepts currently in development, while some older aircraft lack advanced flight management systems. Air traffic control (ATC) supports a variety of commercial aviation and general aviation aircraft that may fly in the same controlled airspace.

SUMMARY

An example system of this disclosure may be implemented as an Integrated Multi-Mode Automation (IMMA) system for automating management by air traffic control of various aircraft with different capabilities to implement various different Trajectory Based Operations (TBO) flight management modes, as well as aircraft without any TBO flight management mode capabilities. An IMMA system of this disclosure may enable air traffic control to issue clearances for different aircraft to make use of different flight management mode capabilities while the aircraft are in flight in a controlled airspace around an airport, such as during approach to landing or during takeoff. An IMMA system of this disclosure may thus facilitate efficient operation of aircraft in controlled airspaces.

In one example, a method includes receiving, by a computing device comprising one or more processors, data associated with one or more aircraft in flight in a controlled airspace. The method further includes selecting, by the computing device, based at least in part on the data associated with the one or more aircraft, a respective flight operation mode from among a plurality of flight operation modes for at least one respective aircraft among the one or more aircraft in flight. The method further includes outputting, by the computing device for transmission to the at least one respective aircraft, an indication of the respective flight operation mode selected for the at least one respective aircraft.

In another example, a computing device includes one or more processors and a computer-readable storage device communicatively coupled to the one or more processors. The computer-readable storage device stores executable instructions that, when executed by the one or more processors, cause the one or more processors to receive data associated with one or more aircraft in flight in a controlled airspace. The executable instructions further cause the one or more processors to select, based at least in part on the data associated with the one or more aircraft, a respective flight operation mode from among a plurality of flight operation modes for at least one respective aircraft among the one or more aircraft in flight. The executable instructions further cause the one or more processors to output, for transmission to the at least one respective aircraft, an indication of the respective flight operation mode selected for the at least one respective aircraft.

In another example, a computer-readable data storage device stores executable instructions that, when executed, cause a computing device comprising one or more processors to perform operations including receiving data associated with one or more aircraft in flight in a controlled airspace. The operations further include selecting, based at least in part on the data associated with the one or more aircraft, a respective flight operation mode from among a plurality of flight operation modes for at least one respective aircraft among the one or more aircraft in flight. The operations further include outputting, for transmission to the at least one respective aircraft, an indication of the respective flight operation mode selected for the at least one respective aircraft.

The details of one or more examples are set forth in the accompanying drawings and the description below. Other features, objects, and advantages of the disclosure will be apparent from the description and drawings, and from the claims.

DETAILED DESCRIPTION

Figure 1:
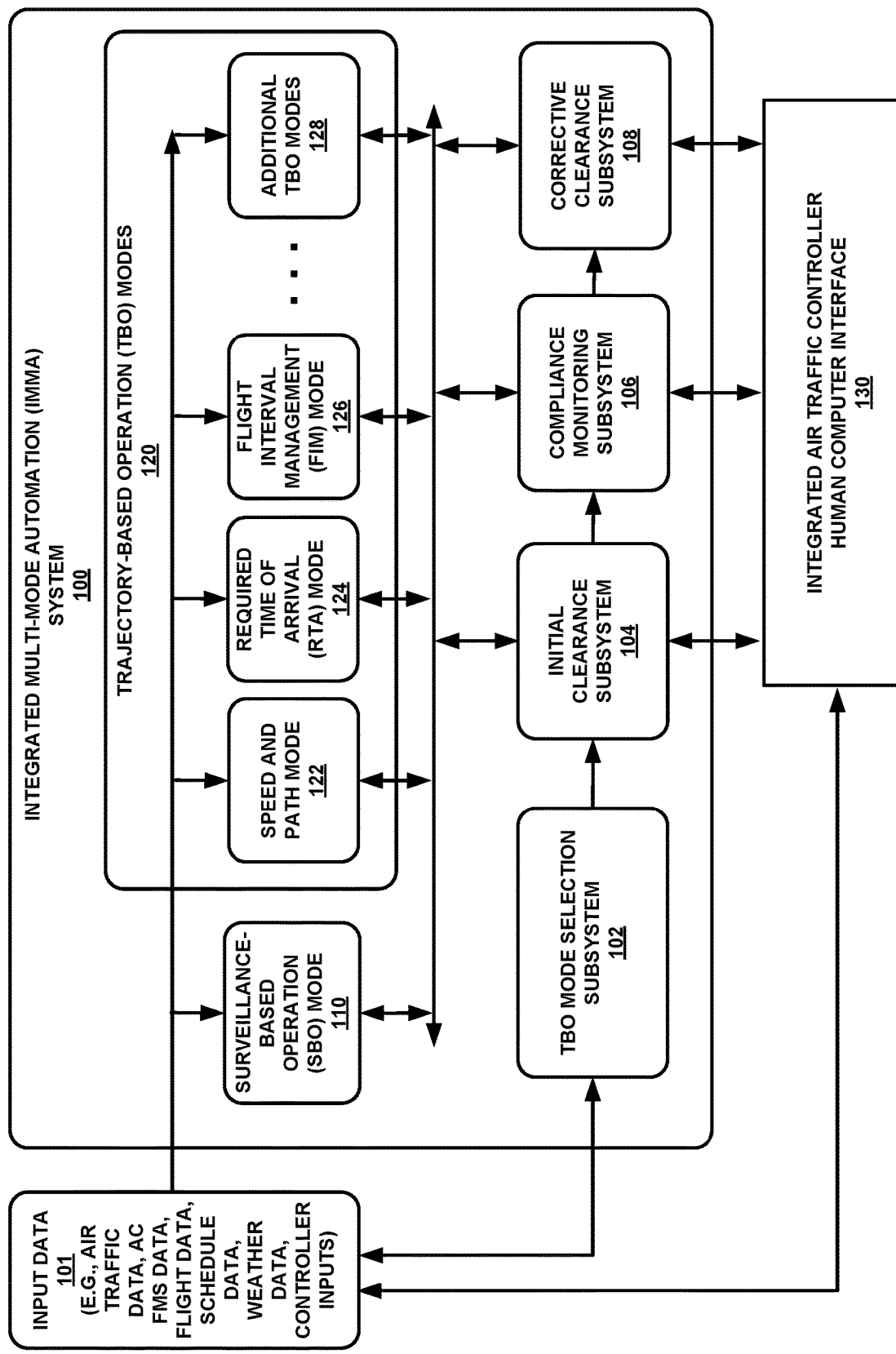
FIG. 1 is a block diagram illustrating an example computing environment configured for an Integrated Multi-Mode Automation (IMMA) system of this disclosure to perform automated management of Air Traffic Control (ATC) management of various aircraft with different TBO flight management modes, in accordance with aspects of the present disclosure.

As noted above, an example system of this disclosure may be implemented as an Integrated Multi-Mode Automation (IMMA) system for automating Air Traffic Control (ATC) management of various aircraft with different advanced Trajectory Based Operations (TBO) flight management capabilities or without advanced flight management capabilities. The techniques of this disclosure describe software-based systems that may enable use of advanced TBO flight management techniques in aircraft equipped to be capable of those advanced techniques, while maintaining coordinated air traffic control when the air traffic in a controlled airspace includes some aircraft equipped with capabilities for one or more advanced flight management techniques, and other aircraft that are equipped only for more traditional flight management techniques.

Over the last several decades, aircraft automation has outpaced air traffic management, such that air traffic control traditionally prevents aircraft from following advanced flight management trajectories in controlled airspaces, and limits aircraft to operating with less efficient trajectories than they are capable of under control of their automated flight management systems (FMS). Modern flight management systems help enable and automate an aircraft to fly on trajectories defined by one of various flight management modes that promote efficient flight and hazard avoidance. However, air traffic control (ATC) systems have not been able to take full advantage of allowing aircraft with modern TBO flight management modes to use the FMS in controlled air traffic around airports, especially during heavy traffic. TBO flight management technology is anticipated to be included in the Next Generation Air Transportation System (NextGen). Systems and methods of this disclosure may enable ground ATC systems to enable new aircraft trajectory automation capabilities to be used in controlled airspaces, and thereby to enable new aircraft trajectory automation capabilities to be used more broadly, such as throughout a flight instead of only in between the controlled airspaces around take-off and landing.

The Air Traffic Organization (ATO) of the Federal Aviation Administration (FAA) in the U.S. has been introducing trajectory-based operations into the National Airspace System (NAS). In the 1990's, Traffic Flow Management (TFM) was introduced to Time-Based Metering (TBM) through the Traffic Management Advisor (TMA) developed by the National Aeronautics and Space Administration (NASA) which uses trajectory predictions to better predict and manage flow into busy airports. TMA provides each aircraft with a schedule (e.g., a time to reach a certain point along its route) so that overall traffic demand on an airport does not exceed the airport capacity. While this provides significant improvement to TFM, it did not help the air traffic controllers utilize the capabilities of the advanced aircraft flight automation modes.

NASA and others have been researching and developing a variety of TBO concepts and flight management modes, e.g., Required Time of Arrival (RTA) and Flight Interval Management (FIM), that require air traffic controllers to utilize new clearances to implement the TBO mode. Traditionally, air traffic controllers have relied on using the same tactical clearances for all aircraft, independent of the level of flight management automation that the aircraft has on board.

For purposes of this disclosure, "advanced TBO flight management modes" or "advanced TBO modes" may refer to RTA, FIM, or other advanced TBO flight management modes, while "traditional flight management mode" may refer to today's nominal controller to aircraft maneuver commands (e.g., altitude change, speed change, new heading, etc). Some older aircraft or general aviation aircraft may lack any FMS and thus be incapable of any form of flight management mode, and instead require manual piloting in a Surveillance-Based Operation (SBO) mode. For purposes of this disclosure, "flight operation mode" may be used as a generic term to refer to any of the various TBO flight management modes or SBO mode, so that it can be generically applied to the flight operation mode of any aircraft, regardless of the aircraft's TBO flight management mode capabilities or lack thereof.

In modern air traffic operation, given the workload during high traffic conditions, air traffic controllers have continued using a single, common set of clearances for handling all aircraft. This single set of clearances is not compatible with the set of TBO flight management modes expected for the NextGen System and is a limiting factor in the air traffic controllers' ability to support advanced TBO flight management modes for aircraft that are equipped for those modes. The adherence to the traditional set of clearances by air traffic control thus restricts aircraft to traditional and less efficient trajectory management in controlled airspaces.

One possible solution to maintain simplicity for air traffic control would be to try to enforce a switch of the entire fleet of aircraft in the national airspace to a newer TBO flight management mode at a set point in time. However, this would not be feasible because it would impose too much burden on aircraft operators. Retrofitting older aircraft with modern flight management systems would pose a substantial burden, and it is unlikely that a requirement to do so would be imposed. As of 2015, the median age of aircraft flying in the U.S. national airspace was thought to be 33.5 years, so it is likely that a significant fraction of aircraft in the airspace will continue to be incapable of applying advanced TBO flight management modes for decades into the future. Thus, an air traffic control trajectory clearance system that were to support clearances for aircraft with advanced TBO flight management modes would likely need to do so only for some aircraft that are equipped for those advanced modes, while also still supporting older aircraft using traditional clearances. Detecting and applying different clearances and flight management modes for different aircraft in a controlled airspace at the same time, to enable use of the advanced and more efficient TBO flight management modes in controlled airspace for aircraft with those capabilities, while still being able to support all aircraft in the controlled airspace, would add significant additional complexity to air traffic control. However, to impose that added operational complexity on the air traffic controllers themselves would increase the already significant workload and mental burden on the air traffic controllers.

A system of this disclosure may instead automate determining which flight management modes to assign to each aircraft in a controlled airspace at a time based on relevant factors. A system of this disclosure may also provide initial clearance to each aircraft, monitor compliance of each aircraft with its assigned operating mode, and respond to any deviations from compliance, such as by issuing a new corrective clearance for a new operating mode. A system of this disclosure may thus automate management of the complexity of operating with multiple flight management capabilities in different aircraft flying in the same controlled airspace at the same time. A system of this disclosure may in some implementations also still present its outputs to air traffic controllers, potentially along with relevant information as to how the system made its determinations, to enable the air traffic controllers to confirm or override the system's determinations based on their own judgments, and thus keep the human air traffic controllers in the loop for the flight management mode assignments to the various aircraft.

FIG. 1 is a block diagram illustrating an example computing environment configured for an Integrated Multi-Mode Automation (IMMA) system 100 of this disclosure to perform automated management of Air Traffic Control (ATC) management of various aircraft with different flight management modes, such as Trajectory-Based Operation (TBO) flight management modes 120, in accordance with aspects of the present disclosure. IMMA system 100 may detect and assign different operating modes to different aircraft, and may thereby enable air traffic control to apply different operating mode clearances to different aircraft in a controlled airspace without causing unmanageable complexity for air traffic controllers. IMMA system 100 may simplify and consolidate air traffic control interactions necessary to support operation of all the aircraft in the relevant controlled airspace in one or more of various flight management modes, potentially including shifting between different flight management modes and potentially including multiple flight management modes assigned to different aircraft in the controlled airspace at once.

An air traffic controller's airspace may typically have, e.g., up to fifteen to twenty aircraft in flight at any given time. IMMA system 100 may automate detection of the flight management capabilities of all those aircraft, assignment of a flight management mode to each of those aircraft, and monitor compliance of each of those aircraft with their respective assigned flight management mode. An IMMA system 100 of this disclosure may thus automate a substantial amount of analysis and decision involved in clearing aircraft in a controlled airspace using a combination of multiple TBO flight management modes.

IMMA system 100 further includes subsystems for common functions shared by all of the flight operation modes, as shown in FIG. 1. IMMA system 100 includes a TBO mode selection subsystem 102, an initial clearance subsystem 104, a compliance monitoring subsystem 106, a corrective clearance subsystem 108, a Trajectory Based Operation (TBO) modes subsystem 120 that includes capabilities for determining aircraft trajectories in accordance with various TBO flight management modes, and a Surveillance-Based Operation (SBO) mode subsystem 110. These subsystems of IMMA system 100 automatically provide the flight mode assignments, clearances, and data needed for the assigned flight operation mode for each aircraft. Initial clearance subsystem 104, compliance monitoring subsystem 106, and corrective clearance subsystem 108 are also operatively coupled to an integrated air traffic controller computer human interface 130 ("air traffic controller interface 130"). Air traffic controller interface 130 may be part of an air traffic controller's workstation. IMMA system 100 may be operably coupled to multiple such air traffic controller interfaces 130 for multiple air traffic controllers at an air traffic control station for a given controlled airspace. Air traffic controller interfaces 130 may include computer-human interface elements to support novel features of IMMA system 100 and an integrated TBO concept of operations.

IMMA system 100 is configured to access relevant air traffic data 101, which may illustratively include aircraft (AC) flight management system (FMS) equipment data, flight data, time based metering schedule data, weather data for the controlled airspace, and air traffic controller inputs, at least some of which may also be available via air traffic controller interface 130 to the air traffic controller. In other examples, IMMA system 100 may receive only a subset of these types of data and/or additional types of data. IMMA system 100 may receive and input the relevant air traffic data 110 to initial TBO mode selection subsystem 102 as well as to one or more of the individual TBO mode subsystems 120 and/or SBO mode subsystem 110 for each of the aircraft in the controlled airspace at a given time. Each of the TBO mode subsystems 120 may receive common input data sets of input data 101. The flight data provides detailed information about the flight such as aircraft type, equipage, route, position, altitude. The schedule data comes input data 101 which provides time-based-metering information on the flight such as the desired Scheduled Time of Arrival (STA) of the flight at a future location along its route. The controller inputs include any manual inputs that a controller might enter relative to the current air traffic control operation.

IMMA system 100 may apply nominal operation of time-based flight schedule metering in the en route to landing environment of the controlled airspace. In this en route to landing environment, flight schedule assignment subsystem 102 may initially assign a target Scheduled Time of Arrival (STA) at a designated metering point or waypoint to each aircraft on approach to landing. Input data 101 may then communicate those STAs and assigned flight schedule data for each aircraft to TBO mode selection subsystem 102.

TBO mode selection subsystem 102 makes a determination of an initial flight operation mode to assign to each aircraft to meet that aircraft's assigned STA at the designated metering point, based on a variety of factors, such as the flight operation mode capabilities each aircraft is equipped with (e.g., from data on the FMS of the aircraft), the STA assigned to each aircraft, flight operation mode certifications for the pilot or crew operating each aircraft, and other operational considerations, such as air traffic and weather conditions in the controlled airspace. TBO mode selection subsystem 102 may initially determine what flight operation modes the aircraft is equipped to be capable of. For example, if a particular aircraft's FMS is only equipped to operate in Speed and Path mode and no other TBO flight management mode, TBO mode selection subsystem 102 may select Speed and Path mode to assign to that aircraft and end the selection process. In some examples, TBO mode selection subsystem 102 may also determine what TBO flight management mode crew certifications the crew of the aircraft has. If the crew is not certified for one or more flight management modes that the aircraft is equipped to fly, then TBO mode selection subsystem 102 may eliminate those one or more flight management modes from selection. Additional examples of factors and criteria TBO mode selection subsystem 102 may apply in determination flight operation mode assignments are discussed further below.

Compliance monitoring subsystem 106 performs ongoing evaluation of each aircraft's progress toward the assigned trajectory, monitoring for non-compliance from progress toward the assigned trajectory, and responding to any detected non-compliant flight trajectory with outputs such as triggering of corrective clearance subsystem 108 and/or an alert to the air traffic controller interface 130. Corrective clearance subsystem 108 may perform actions to get a non-conforming aircraft back on track to meet the assigned STA. This may include corrective clearance subsystem 108 reviewing the non-compliant flight trajectory in comparison with the flight operation mode assigned to the non-compliant aircraft, and with the flight trajectories and flight operation modes of other aircraft in the controlled airspace. This may also include corrective clearance subsystem 108 switching the assigned flight operation modes for the non-compliant aircraft and potentially additional aircraft to different flight operation modes. Corrective clearance subsystem 108 is depicted separately from initial clearance subsystem 104 in FIG. 1, but may overlap with, share capabilities or functions with, or be the same as initial clearance subsystem 104 in some examples.

IMMA system 100 may provide outputs of subsystems 104, 106, 108 to controller interface 130. Controller interface 130 may be designed for ease of use in a multiple TBO flight mode environment. IMMA system 100 may focus on providing an air traffic controller with the necessary data to oversee or implement a selected operating mode for each aircraft without requiring the controller to have to reference which operating mode he or she is implementing on each flight. IMMA system 100 may simply provide data for each aircraft for the operating mode selected by IMMA system 100 for that aircraft to the air traffic controller interface 130, without requiring the air traffic controller to select the operating mode for each aircraft or check compliance along the trajectory, or develop corrective clearances which could require mode changes.

Trajectory Based Operation (TBO) modes subsystem 120 includes information and capabilities for determining various flight management modes and other operating modes, illustratively including a Speed and Path mode subsystem 122, Required Time of Arrival (RTA) mode subsystem 124, Flight Interval Management (FIM) mode subsystem 126, and one or more additional TBO mode subsystems 128, which may include other presently existing or subsequently introduced flight management modes. TBO modes subsystem 120 may evaluate potential trajectories of a given aircraft in each of one or more of the flight operation modes.

All of the "subsystems" referred to in FIG. 1 may be implemented for example to include software modules, software libraries, portions of a single software application, data sets, specialized processing hardware, and/or any other configuration of computing or processing hardware and/or software capable of executing the described functions as part of a computing system. Examples of a computing system implementing IMMA system 100 are described further below.

Some of the flight management modes for which example IMMA system 100 is enabled are broad-based and are expected to support the vast majority of aircraft, such as Speed and Path mode, while some of which may initially target only a subset of aircraft that is relatively smaller for the time being but that is expected to grow over time that have advanced flight automation capabilities, such as for RTA and FIM. IMMA system 100 may also be enabled to support SBO mode for older aircraft that do not have any automated flight management capabilities, such that IMMA system 100 may be assured of being able to support any aircraft in service.

Speed and Path mode 122 generally involves advising aircraft pilots on a path to take and a speed with which to pursue that path, where the path includes a path of descent. The pilot may then input that path into the aircraft's Flight Management System (FMS) to automatically fly in accordance with the parameters defined by the path, in a closed loop control scheme. Speed and Path mode is a ground-based TBO mode. Speed and Path mode may in some examples be considered a baseline or default TBO mode because it may be capable of supporting the majority of current and future aircraft in service and the capabilities of their flight management systems (FMS). Speed and Path may also be used as a second corrective assigned mode in some cases since it is the one TBO flight management mode that all aircraft with an FMS may be capable of implementing, and switching all aircraft in a controlled airspace to TBFM mode may thus ensure eliminating potential complexities of multiple flight management modes being used in the airspace at the same time.

Required Time of Arrival (RTA) mode 124 represents an aircraft-based TBO mode, rather than ground-based like Speed and Path, that many current commercial aircraft support as a component of the on-board FMS automation. RTA mode 124 specifies the time of arrival of the aircraft at a selected future metering point or waypoint, and enables the aircraft FMS automation to adjust the aircraft's speed to arrive at that specified metering point at that time. RTA allows the aircraft to adjust speed for factors such as wind while en route, in a closed loop control scheme. Because the aircraft operating in RTA mode is not required to follow a specified speed in accordance with Speed and Path instructions from air traffic control, but rather only has the requirement to arrive at a given position at a given time, the aircraft FMS has less constraint and more flexibility to manage the aircraft's trajectory efficiently to arrive at the STA metering point at the required time. For instance, the FMS in RTA mode may control the aircraft to optimize factors such as speed, altitude descent, and forward path for fuel efficiency while compensating for wind, which may thus promote better fuel efficiency than in Speed and Path mode.

Flight Interval Management (FIM) mode 126 is based on the own aircraft's FMS detecting the trajectories of other aircraft using an Automatic Dependent Surveillance—Broadcast (ADS-B) system and maintaining a fixed interval of distance with another aircraft in the forward position in an air traffic lane, as tracked by ADS-B position information from the forward aircraft to the own aircraft. FIM covers a range of different implementations and applications, and may be considered to include extensions thereof such as Advanced Interval Management (AIM). FIM may include "achieve by" and "capture and maintain" applications. FIM mode 126 may also enable less constraint and greater flexibility for the FMS to manage flight of the aircraft to optimize factors such as speed, altitude descent, and forward path of the aircraft for fuel efficiency within the requirements of the flight management mode, since managing flight to maintain a fixed interval of time relative to a forward aircraft in a traffic lane is a less constrained requirement than adhering to a path and a speed as in Speed and Path. IMMA system 100 may evaluate the relative benefits such as these of each of the different flight management modes, including Speed and Path, RTA, and FIM, and how they compare to other relevant factors as part of determining what flight management modes to assign to each aircraft.

Additional TBO modes subsystem 128 may be based on other concepts or capabilities, some examples of which are described further below. SBO subsystem 110 may be based on traditional SBO operating mode, which may be applied to older aircraft that are not equipped with an FMS or with a capability for following any TBO flight management mode.

As noted above, TBO mode assignment subsystem 102 of IMMA system 100 may determine which of the several TBO modes 120 (or SBO mode 110) to assign to each of the several aircraft in an air traffic environment for a given interval of time. IMMA system 100 may apply a variety of factors in determining which TBO modes 120 to assign to each of the aircraft, illustratively including factors such as: which TBO modes each of the aircraft is equipped to be capable of; whether or not all of the aircraft in the air traffic environment are equipped to be capable of a given TBO mode; weather conditions that are prevailing at the time or are forecast for the near future in the air traffic environment; and whether all aircraft remain compliant with their assigned TBO mode. More examples of the factors and criteria IMMA system 100 may in determining which TBO modes 120 to assign to each of the aircraft are described below.

In some examples, TBO mode assignment subsystem 102 may compare the available TBO flight management modes of other aircraft ahead of and/or behind a particular aircraft in the controlled airspace, and select the flight operation mode for the particular aircraft based in part on the flight operation mode capabilities of one or more other aircraft in the airspace, or on the flight operation mode already being used by one or more other aircraft in the airspace. For example, if the aircraft ahead of a particular aircraft has already been assigned RTA mode 124, and the particular aircraft is also capable of RTA mode 124, then initial clearance subsystem 104 may also assign RTA mode 124 to the particular aircraft; or if the aircraft ahead of the particular aircraft has already been assigned FIM mode 126, and the particular aircraft is also capable of FIM mode 126, then initial clearance subsystem 104 may also assign FIM mode 126 to the particular aircraft.

TBO mode assignment subsystem 102 of IMMA system 100 may thus apply hierarchical criteria in selecting flight operation modes, by first filtering by information on what flight operation mode each aircraft is equipped to be capable of, and subsequently to evaluate other operational considerations or criteria to select a mode assignment for a given aircraft, and finally to output the selected mode to air traffic controller interface 130 for confirmation or override. IMMA system 100 may prefer more advanced modes for aircraft with the capabilities for them and given certain conditions, while defaulting to Speed and Path mode 122 under other conditions. FIM mode 126 may generally pose a lighter workload on the air traffic controller than some other modes. RTA mode 124 may generally introduce less error than Speed and Path mode 122. However, in certain operating conditions, e.g., in inclement weather, it may be more robust to default to Speed and Path mode 122.

Initial clearance subsystem 104 may also evaluate how many of the aircraft in the airspace are equipped for an advanced TBO mode to determine what mode to assign a given aircraft. For example, if an aircraft is equipped for FIM mode 126 but none or almost none of the other aircraft in the airspace are equipped for FIM mode 126, there may be less benefit to using FIM mode 126, and initial clearance subsystem 104 may assign a different mode instead. Initial clearance subsystem 104 may also evaluate the general crowdedness of the air traffic in the greater area around the controlled airspace or generally how busy the air traffic is in the controlled airspace. In some examples, initial clearance subsystem 104 may place higher priority on assigning a more advanced mode such as RTA or FIM in a busier or more crowded airspace.

Corrective clearance subsystem 108 of IMMA system 100 may also apply various criteria, in response to IMMA system 100 detecting an aircraft deviating from compliance with its assigned flight operation mode, to evaluate whether to assign the non-compliant aircraft a new mode. In some examples, if an aircraft in RTA mode 124 deviates from the trajectory specified for the aircraft to meet its STA in RTA mode, corrective clearance subsystem 108 may either issue new RTA mode instructions to the aircraft (e.g., a new Required Time of Arrival at the STA consistent with the aircraft's current trajectory and the trajectories of the other air traffic in the airspace), or switch the aircraft's assignment to Speed and Path mode 122 and issue the aircraft instructions for a TBFM speed and path to follow. Similarly, if an aircraft in FIM mode 126 deviates from the fixed interval trajectory from the forward aircraft in the traffic lane as specified for the aircraft in FIM mode 126, corrective clearance subsystem 108 may evaluate whether to output an instruction for the aircraft to return to the fixed interval trajectory in FIM mode 126, or to switch the aircraft's assignment to Speed and Path mode 122 and issue the aircraft Speed and Path speed and path instructions. As another example, if an aircraft has an emergency, corrective clearance subsystem 108 may account for the air traffic to be re-shuffled to give that aircraft priority for landing, and may issue new mode assignments to some or all of the air traffic to manage the modification of the order of the air traffic.

IMMA system 100 may thus generate outputs for display or other indication to ATC interface 130 of its determinations of which TBO flight management modes to assign to each of the aircraft. IMMA system 100 may present outputs that include a recommended TBO flight management mode for a given aircraft. IMMA system 100 may also output, to air traffic controller interface 130 and/or to a given aircraft, relevant information on how IMMA system 100 made the determinations of what TBO flight management mode to assign to each aircraft. Air traffic controller interface 130 may display or present the determinations of IMMA system 100 to an air traffic controller in a way that facilitates the air traffic controller either confirming or overriding any individual determination of an assigned flight operation mode for a given aircraft. Air traffic controller interface 130 may be implemented as any form of computing device, computer interface device, and/or component of an air traffic controller workstation.

IMMA system 100 may thus automate interactions and selections between different TBO flight management modes. IMMA system 100 may output its mode selections, and potentially information about the criteria applied in arriving at the determined assignments, to air traffic controller interface 130 to enable an air traffic controller to confirm or override the mode assignments, thus enabling the air traffic controller to act as the ultimate arbitrator of the mode assignments before the assignments are transmitted to the aircraft. IMMA system 100 may thus combine automation of various elements of determining how the different flight management modes would affect the trajectories of the aircraft and the state of the air traffic, with support for involvement and oversight by the air traffic controller. IMMA system 100 may thus simplify the inherent complexities of using a variety of different TBO modes and trajectory implementation strategies, and help enable the air traffic controller to execute the desired trajectories, maintain situational awareness of the controlled airspace, and support off-nominal situations.

As depicted in FIG. 1, an IMMA system 100 of this disclosure may provide automation to simplify the inherent complexities of using multiple TBO flight management modes in a controlled airspace by focusing air traffic controller interactions on common core functions (e.g., initial clearance, compliance monitoring) that all TBO flight management modes support. For example, monitoring compliance for an aircraft in RTA mode 124 using speed and path to control delivery time at a metering point is different than monitoring compliance for an aircraft executing Flight Interval Management (FIM) mode 126 which maintains a time-based spacing interval with another aircraft. Using IMMA system 100, an air traffic controller does not need to track compliance differently for the two different aircraft using two different flight management implementations. Instead, IMMA system 100 may account for the different flight management modes assigned to the various aircraft, and inform the air traffic controller if IMMA system 100 detects an aircraft as being out of compliance.

Additional TBO modes 128 may include extensions of RTA and FIM. Additional TBO modes 128 may also include, for example, Four-Dimensional Advanced Arrivals (4D AA) mode developed by the FAA, Dynamic Required Navigation Performance (DRNP), Advanced Interval Management (AIM), and extensions thereof. 4D AA includes an integrated TBO concept. DRNP for 4D Trajectory Based Operations may increase air traffic capacity by introducing additional routes to accommodate traffic demand and enabling reroutes in airspace impacted by adverse weather, traffic, or other disturbances. AIM is an advanced version of FIM. Additional TBO modes 128 may also include integrated TBO modes that integrate or combine two or more different TBO modes (e.g., FIM, AIM, RTA, Speed and Path).

Figure 2:
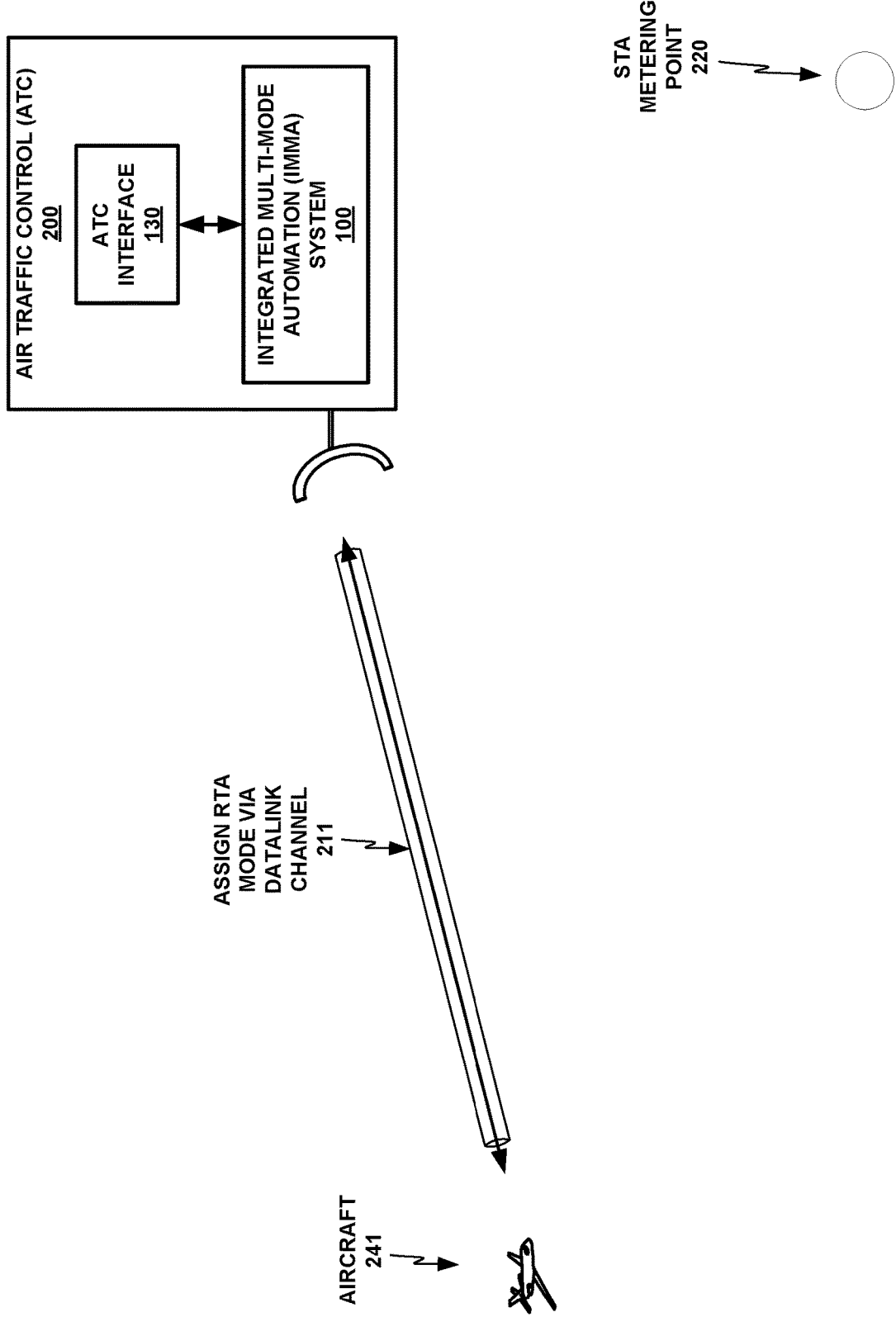
FIG. 2 shows a conceptual diagram of an example of the IMMA system of FIG. 1 in an air traffic control facility communicating an assigned flight management mode via a datalink channel to an aircraft in a controlled airspace on approach to a metering point, in accordance with aspects of the present disclosure.
Figure 3:
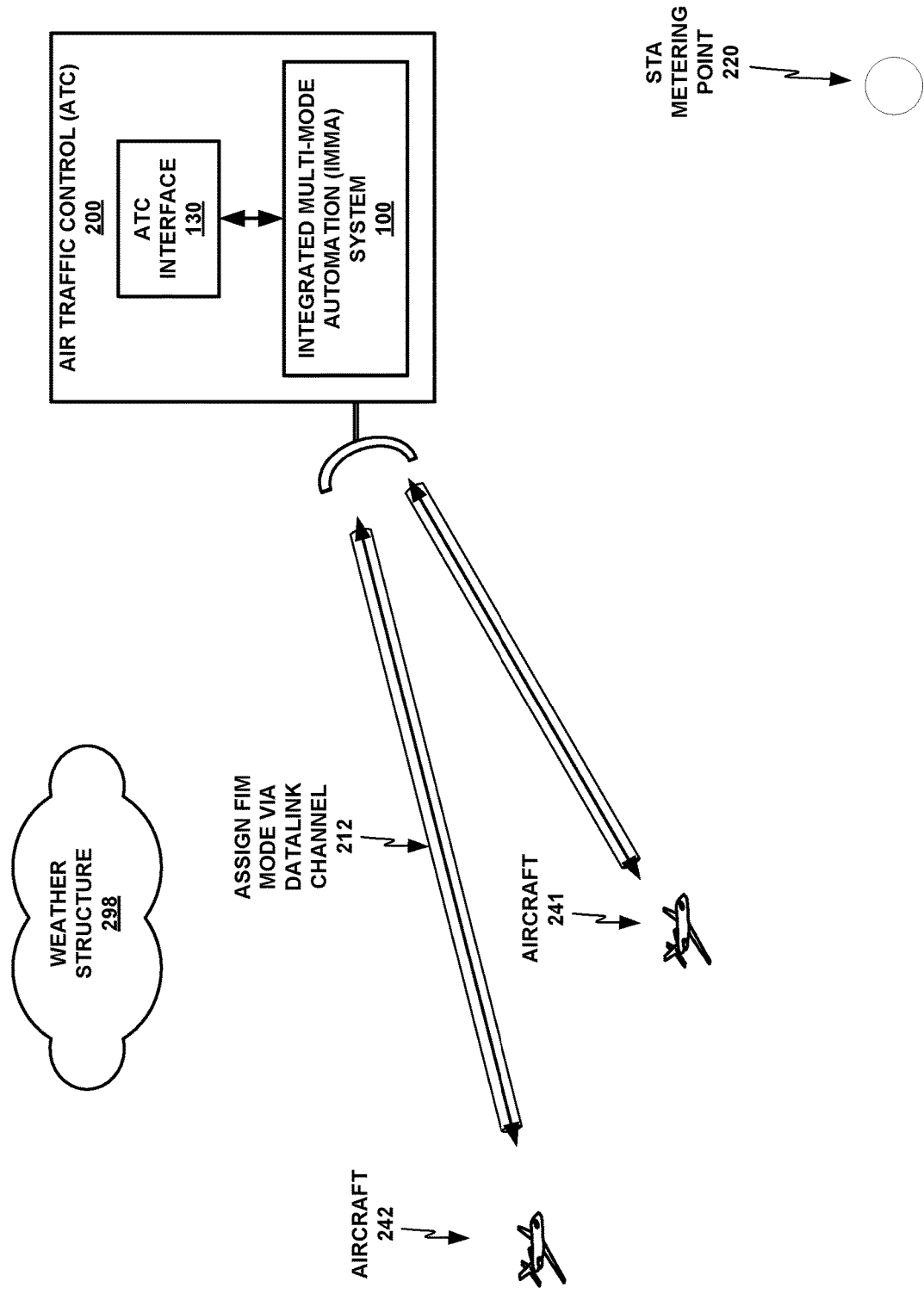
FIG. 3 shows a conceptual diagram of an example IMMA system in an air traffic control facility communicating an assigned flight management mode via a datalink channel to a second aircraft entering a traffic lane in a rearward position behind a first aircraft in a controlled airspace on approach to a metering point, in accordance with aspects of the present disclosure.
Figure 4:
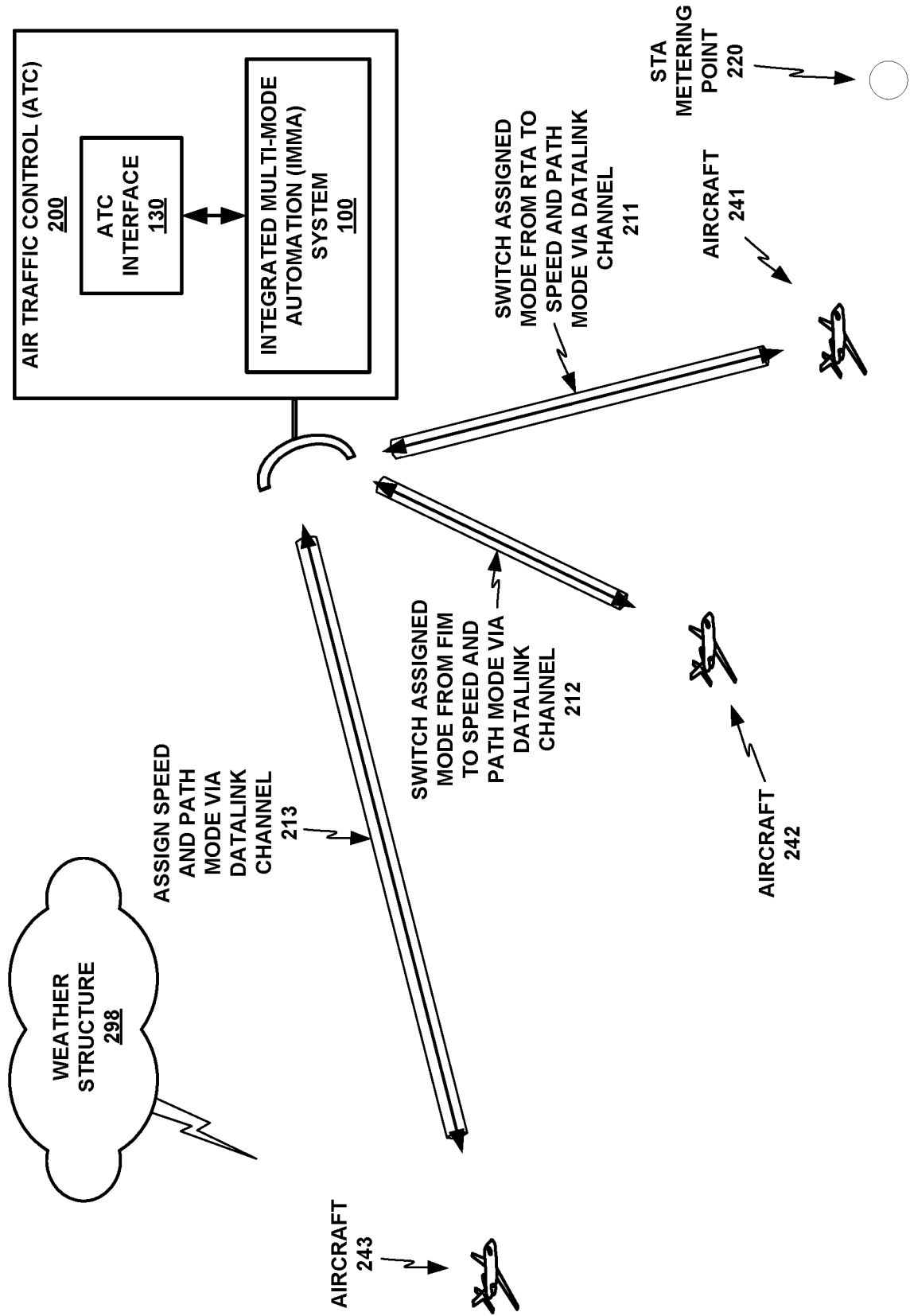
FIG. 4 shows a conceptual diagram of an example IMMA system in an air traffic control facility detecting hazardous weather associated with weather structure, and communicating an initial flight management mode assignment to a third aircraft in a traffic lane and corrective flight management mode assignments to the first two aircraft based on a detection of the hazardous weather, in accordance with aspects of the present disclosure.

FIGS. 2-4 show conceptual diagrams for IMMA system 100 selecting and issuing a sequence of TBO flight management modes to a column of aircraft in a traffic lane in a controlled airspace en route to landing at an airport runway, in accordance with aspects of the present disclosure. FIG. 2 shows a conceptual diagram of IMMA system 100 of FIG. 1 in an air traffic control facility 200 communicating an assigned flight management mode via a datalink channel 211 to an aircraft 241 in the controlled airspace on approach to the runway (not shown), in accordance with aspects of the present disclosure. Air traffic control facility 200 may first assign aircraft 241 a Scheduled Time of Arrival (STA) to arrive at STA metering point 220, which is a position in the airspace along the route to the runway. In this example, IMMA system 100 may determine that aircraft 241 has an FMS equipped to be capable of operating the aircraft 241 in either RTA mode or Speed and Path mode. IMMA system 100 may further determine that the crew of aircraft 241 is also certified for both RTA and Speed and Path modes, and that no operating conditions exist that would lead to a preference for Speed and Path mode. IMMA system 100 may then determine to assign RTA mode to aircraft 241. IMMA system 100 may output the proposed assignment of RTA mode for aircraft 241 to air traffic controller interface 130, and receive a confirmation input from the air traffic controller. IMMA system 100 may then communicate to aircraft 241, via datalink channel 221, the RTA mode assignment and RTA instructions for the Required Time of Arrival at STA metering point 220.

FIG. 3 shows a conceptual diagram of IMMA system 100 in air traffic control facility 200 communicating an assigned flight management mode via a datalink channel 212 to a second aircraft 242 entering the traffic lane in the rearward position behind aircraft 241 in the controlled airspace on approach to the runway, in accordance with aspects of the present disclosure. Air traffic control facility 200 may first assign aircraft 242 a Scheduled Time of Arrival (STA) to arrive at STA metering point 220. In this example, IMMA system 100 may determine that aircraft 242 has an FMS equipped to be capable of operating the aircraft 242 in either FIM mode or Speed and Path mode. IMMA system 100 may further determine that the crew of aircraft 241 is also certified for both FIM and Speed and Path modes. Meanwhile, IMMA system 100 also receives new data on a potentially convective weather structure 298 in the airspace, and monitors the weather data to determine whether to begin modifying flight management mode assignments based on the activity of weather structure 298. However, IMMA system 100 determines that there is currently no need to let weather structure 298 affect the flight management mode assignments because it does not meet threshold criteria for hazardous or unfavorable weather (e.g., wind speed remains below a nominal threshold, no hail or lightning is detected), and that no operating conditions exist that would lead to a preference for Speed and Path mode. IMMA system 100 may then determine to assign FIM mode to aircraft 242. IMMA system 100 may output the proposed assignment of FIM mode for aircraft 241 to air traffic controller interface 130, and receive a confirmation input from the air traffic controller. IMMA system 100 may then communicate to aircraft 242, via datalink channel 222, the FIM mode assignment and FIM instructions for aircraft 242 to adhere to a fixed time interval after aircraft 241 for arriving at STA metering point 220.

FIG. 4 shows a conceptual diagram of IMMA system 100 in air traffic control facility 200 detecting hazardous weather associated with weather structure 298, and communicating an initial flight management mode assignment to a third aircraft 243 in the traffic lane and corrective flight management mode assignments to the first two aircraft 241 and 242 based on the detection of the hazardous weather, in accordance with aspects of the present disclosure. Air traffic control facility 200 may assign aircraft 243 a Scheduled Time of Arrival (STA) to arrive at STA metering point 220. In this example, IMMA system 100 may determine that aircraft 243 has an FMS equipped to be capable of operating the aircraft 243 in only in Speed and Path mode, and may thus determine Speed and Path mode as the assigned mode for aircraft 243. IMMA system 100 may also receive further new data indicating that weather structure 298 is exhibiting convective and hazardous conditions. In some examples, IMMA system 100 may also detect that one or both of aircraft 241 and 242 deviate from the trajectories defined by their assigned flight management modes and mode instructions, such as due to wind or turbulence. IMMA system 100 may determine that having all aircraft in the airspace operate in Speed and Path mode would provide the least risk of error based on the current state of the hazardous weather conditions, and/or based on detected non-conformance of one or more of the aircraft with their originally assigned flight modes and mode instructions. IMMA system 100 may thus output to air traffic controller interface 130 a proposed initial assignment of TBFM mode for aircraft 243 and corrective assignments of TBFM mode for aircraft 241 and aircraft 242, and receive confirmation inputs from the air traffic controller. IMMA system 100 may then communicate to aircraft 243, via datalink channel 223, the initial Speed and Path mode assignment with path and speed instructions for aircraft 243 to follow for arriving at STA metering point 220 at its STA, and communicate corrective Speed and Path mode assignments and instructions to aircraft 241 and 242.

Figure 5:
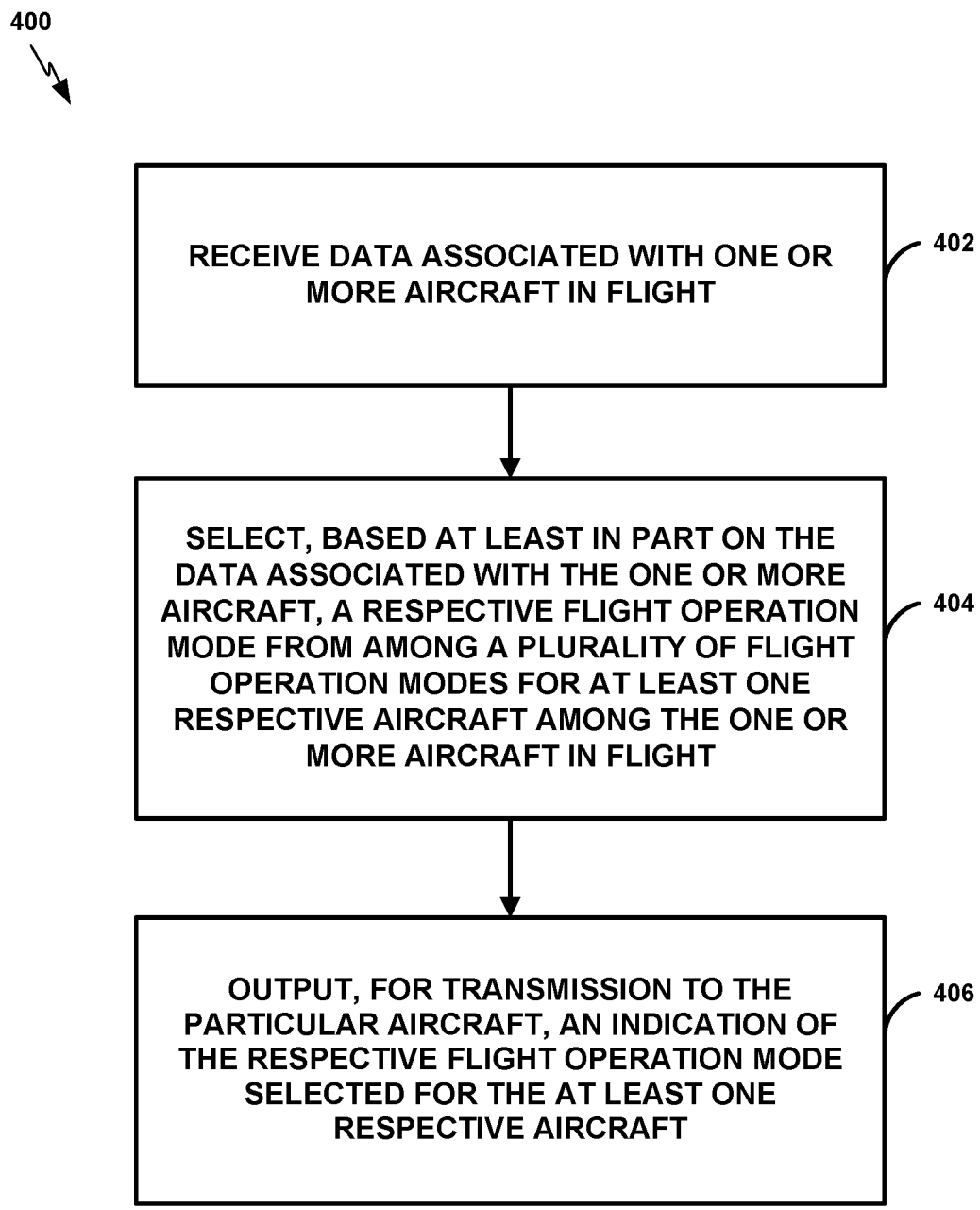
FIG. 5 is a flowchart of an example process that may be performed by an IMMA system, such as any of the IMMA systems shown in FIGS. 1-4, in accordance with aspects of the present disclosure.

FIG. 5 is a flowchart of an example process 400 that IMMA system 100 of FIG. 1 may perform, in accordance with aspects of the present disclosure. In this example, IMMA system 100, implemented by a computing device comprising one or more processors, receives data associated with one or more aircraft in flight (e.g., IMMA system 100 receives input data 101 including aircraft FMS data, flight crew certification data, flight data, schedule data, etc. for any of aircraft 241, 242, 243) (402). IMMA system 100 selects a respective flight operation mode (e.g., a TBO flight management mode such as Speed and Path mode, RTA mode, or FIM mode, or SBO mode for an aircraft with no TBO flight management capability) from among a plurality of flight operation modes for at least one respective aircraft among the one or more aircraft in flight, based at least in part on the data associated with the one or more aircraft (e.g., based on the FMS capabilities, the crew certifications, the weather conditions, the state of the surrounding air traffic, and other factors such as described above) (404). IMMA system 100 outputs, for transmission to the at least one respective aircraft, an indication of the respective flight operation mode selected for the at least one respective aircraft (e.g., via data channels 211, 212, 213) (406).

Figure 6:
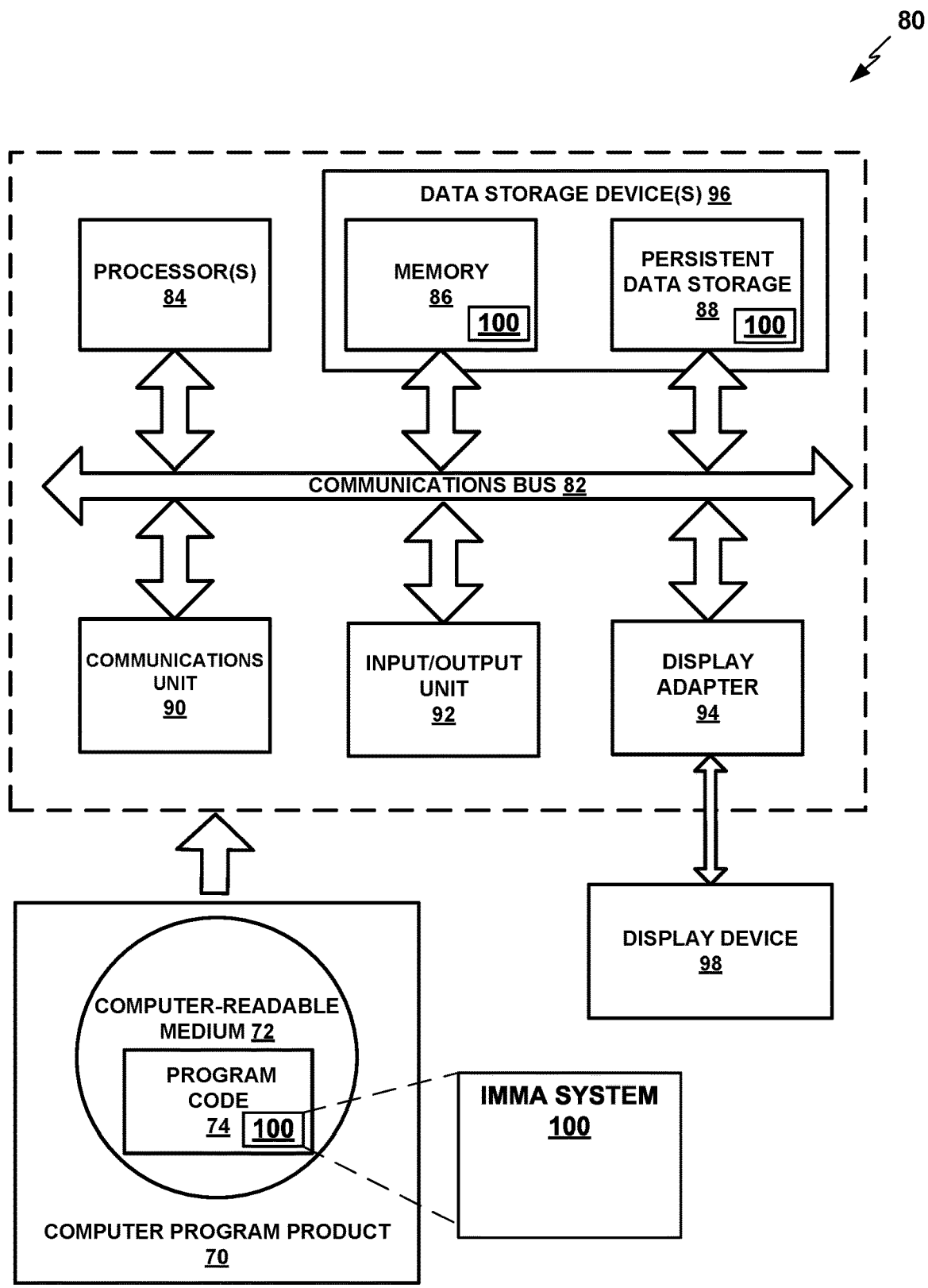
FIG. 6 is a block diagram of a computing device that may be used to host and/or execute an implementation of an IMMA system, such as any of the IMMA systems shown in FIGS. 1-5, in accordance with various aspects of the present disclosure.

FIG. 6 is a block diagram of a computing device 80 that may be used to host and/or execute an implementation of IMMA system 100 as described above with reference to FIGS. 1-5, in various aspects of this disclosure. In various examples, IMMA system 100 hosted and/or executing on computing device 80 may perform at least some of the functions described above. Computing device 80 may be a laptop computer, desktop computer, or any other type of computing device. Computing device 80 may also be a server in various examples, including a virtual server that may be run from or incorporate any number of computing devices. A computing device may operate as all or part of a real or virtual server, and may be or incorporate a specialized air traffic control workstation, other workstation, server, mainframe computer, notebook or laptop computer, desktop computer, tablet, smartphone, feature phone, or other programmable data processing apparatus of any kind. Other implementations of a computing device 80 may include a computer or device having capabilities or formats other than or beyond those described herein.

In the illustrative example of FIG. 6, computing device 80 includes communications bus 82, which provides communications between processor unit 84, memory 86, persistent data storage 88, communications unit 90, and input/output (I/O) unit 92. Communications bus 82 may include a dedicated system bus, a general system bus, multiple buses arranged in hierarchical form, any other type of bus, bus network, switch fabric, or other interconnection technology. Communications bus 82 supports transfer of data, commands, and other information between various subsystems of computing device 80.

Processor 84 may be a programmable central processing unit (CPU) configured for executing programmed instructions stored in memory 86. In another illustrative example, processor unit 84 may be implemented using one or more heterogeneous processor systems in which a main processor is present with secondary processors on a single chip. In yet another illustrative example, processor unit 84 may be a symmetric multi-processor system containing multiple processors of the same type. Processor unit 84 may be a reduced instruction set computing (RISC) microprocessor, an x86 compatible processor, or any other suitable processor. In various examples, processor unit 84 may include a multi-core processor, such as a dual core or quad core processor, for example. Processor unit 84 may include multiple processing chips on one die, and/or multiple dies on one package or substrate, for example. Processor unit 84 may also include one or more levels of integrated cache memory, for example. In various examples, processor unit 84 may comprise one or more CPUs distributed across one or more locations.

Data storage device 96 includes memory 86 and persistent data storage 88, which are in communication with processor unit 84 through communications bus 82. Memory 86 can include a random access semiconductor memory (RAM) for storing application data, i.e., computer program data, for processing. While memory 86 is depicted conceptually as a single monolithic entity, in various examples, memory 86 may be arranged in a hierarchy of caches and in other memory devices, in a single physical location, or distributed across a plurality of physical systems in various forms. While memory 86 is depicted physically separated from processor unit 84 and other elements of computing device 80, memory 86 may refer equivalently to any intermediate or cache memory at any location throughout computing device 80, including cache memory proximate to or integrated with processor unit 84 or individual cores of processor unit 84.

Persistent data storage 88 may include one or more hard disc drives, solid state drives, flash drives, rewritable optical disc drives, magnetic tape drives, or any combination of these or other data storage mediums. Persistent data storage 88 may store computer-executable instructions or computer-readable program code for an operating system, application files including program code, data structures or data files, and any other type of data. These computer-executable instructions may be loaded from persistent data storage 88 into memory 86 to be read and executed by processor unit 84 or other processors. Data storage device 96 may also include any other hardware elements capable of storing information, such as, for example and without limitation, data, program code in functional form, and/or other suitable information, either on a temporary basis and/or a permanent basis.

Persistent data storage 88 and memory 86 are examples of physical computer-readable data storage devices. Data storage device 96 may include any of various forms of volatile memory that may require being periodically electrically refreshed to maintain data in memory, while those skilled in the art will recognize that this also constitutes an example of a physical computer-readable data storage device. Executable instructions may be stored on a physical medium when program code is loaded, stored, relayed, buffered, or cached on a physical medium or device, including if only for only a short duration or only in a volatile memory format.

Processor unit 84 can also be suitably programmed to read, load, and execute computer-executable instructions or computer-readable program code for an IMMA system 100, as described in greater detail above. This program code may be stored on memory 86, persistent data storage 88, or elsewhere in computing device 80. This program code may also take the form of program code 74 stored on computer-readable medium 72 included in computer program product 70, and may be transferred or communicated, through any of a variety of local or remote means, from computer program product 70 to computing device 80 to be enabled to be executed by processor unit 84, as further explained below. Computer program product 70 may be a computer program storage device in some examples.

The operating system may provide functions such as device interface management, memory management, and multiple task management. The operating system can be a Unix based operating system, a non-Unix based operating system, a network operating system, a real-time operating system (RTOS), or any other suitable operating system. Processor unit 84 can be suitably programmed to read, load, and execute instructions of the operating system.

Communications unit 90, in this example, provides for communications with other computing or communications systems or devices. Communications unit 90 may provide communications through the use of physical and/or wireless communications links. Communications unit 90 may include a network interface card for interfacing with a LAN, an Ethernet adapter, a Token Ring adapter, a modem for connecting to a transmission system such as a telephone line, or any other type of communication interface. Communications unit 90 can be used for operationally connecting many types of peripheral computing devices to computing device 80, such as printers, bus adapters, and other computers. Communications unit 90 may be implemented as an expansion card or be built into a motherboard, for example.

The input/output unit 92 can support devices suited for input and output of data with other devices that may be connected to computing device 80, such as keyboard, a mouse or other pointer, a touchscreen interface, an interface for a printer or any other peripheral device, a removable magnetic or optical disc drive (including CD-ROM, DVD-ROM, or Blu-Ray), a universal serial bus (USB) receptacle, or any other type of input and/or output device. Input/output unit 92 may also include any type of interface for video output in any type of video output protocol and any type of monitor or other video display technology, in various examples. It will be understood that some of these examples may overlap with each other, or with example components of communications unit 90 or data storage device 96. Input/output unit 92 may also include appropriate device drivers for any type of external device, or such device drivers may reside elsewhere on computing device 80 as appropriate.

Computing device 80 also includes a display adapter 94 in this illustrative example, which provides one or more connections for one or more display devices, such as display device 98, which may include any of a variety of types of display devices. It will be understood that some of these examples may overlap with example components of communications unit 90 or input/output unit 92. Input/output unit 92 may also include appropriate device drivers for any type of external device, or such device drivers may reside elsewhere on computing device 80 as appropriate. Display adapter 94 may include one or more video cards, one or more graphics processing units (GPUs), one or more video-capable connection ports, or any other type of data connector capable of communicating video data, in various examples. Display device 98 may be any kind of video display device, such as a monitor, a television, or a projector, in various examples. Display device 98 may also include or be part of a specialized air traffic control display, and may be part of an air traffic controller interface 130 as shown in FIG. 1.

Input/output unit 92 may include a drive, socket, or outlet for receiving computer program product 70, which includes a computer-readable medium 72 having computer program code 74 stored thereon. For example, computer program product 70 may be a CD-ROM, a DVD-ROM, a Blu-Ray disc, a magnetic disc, a USB stick, a flash drive, or an external hard disc drive, as illustrative examples, or any other suitable data storage technology. Input/output unit 92 may also include or be part of a specialized air traffic control display, and may include or be part of an air traffic controller interface 130 as shown in FIG. 1.

Computer-readable medium 72 may include any type of optical, magnetic, or other physical medium that physically encodes program code 74 as a binary series of different physical states in each unit of memory that, when read by computing device 80, induces a physical signal that is read by processor 84 that corresponds to the physical states of the basic data storage elements of storage medium 72, and that induces corresponding changes in the physical state of processor unit 84. That physical program code signal may be modeled or conceptualized as computer-readable instructions at any of various levels of abstraction, such as a high-level programming language, assembly language, or machine language, but ultimately constitutes a series of physical electrical and/or magnetic interactions that physically induce a change in the physical state of processor unit 84, thereby physically causing or configuring processor unit 84 to generate physical outputs that correspond to the computer-executable instructions, in a way that causes computing device 80 to physically assume new capabilities that it did not have until its physical state was changed by loading the executable instructions comprised in program code 74.

In some illustrative examples, program code 74 may be downloaded over a network to data storage device 96 from another device or computer system for use within computing device 80. Program code 74 including computer-executable instructions may be communicated or transferred to computing device 80 from computer-readable medium 72 through a hard-line or wireless communications link to communications unit 90 and/or through a connection to input/output unit 92. Computer-readable medium 72 comprising program code 74 may be located at a separate or remote location from computing device 80, and may be located anywhere, including at any remote geographical location anywhere in the world, and may relay program code 74 to computing device 80 over any type of one or more communication links, such as the Internet and/or other packet data networks. The program code 74 may be transmitted over a wireless Internet connection, or over a shorter-range direct wireless connection such as wireless LAN, Bluetooth™, Wi-Fi™, or an infrared connection, for example. Any other wireless or remote communication protocol may also be used in other implementations.

The communications link and/or the connection may include wired and/or wireless connections in various illustrative examples, and program code 74 may be transmitted from a source computer-readable medium 72 over mediums, such as communications links or wireless transmissions containing the program code 74. Program code 74 may be more or less temporarily or durably stored on any number of intermediate physical computer-readable devices and mediums, such as any number of physical buffers, caches, main memory, or data storage components of servers, gateways, network nodes, mobility management entities, or other network assets, en route from its original source medium to computing device 80.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processing units (e.g., processors) to retrieve instructions, code and/or data structures for implementation of the techniques described in this disclosure. A computer program product may include a computer-readable medium.

By way of example, and not limitation, such computer-readable storage media can comprise random access memory (RAM), read-only memory (ROM), electrically erasable programmable read-only memory (EEPROM), compact disc read-only memory (CD-ROM) or other optical disk storage, magnetic disk storage, or other magnetic storage devices, flash memory, or any other storage medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processing units (e.g., processors), such as one or more digital signal processors (DSPs), general purpose microprocessors, application specific integrated circuits (ASICs), field programmable logic arrays (FPGAs), or other equivalent integrated or discrete logic circuitry. Accordingly, the term "processing unit" or "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processing units as described above, in conjunction with suitable software and/or firmware.

Depending on the embodiment, certain acts or events of any of the methods described herein can be performed in a different sequence, may be added, merged, or left out altogether (e.g., not all described acts or events are necessary for the practice of the method). Moreover, in certain embodiments, acts or events may be performed concurrently, e.g., through multi-threaded processing, interrupt processing, or multiple processing units, rather than sequentially.

In some examples, a computer-readable storage medium comprises a non-transitory medium. The term "non-transitory" indicates that the storage medium is not embodied in a carrier wave or a propagated signal. In certain examples, a non-transitory storage medium may store data that can, over time, change (e.g., in RAM or cache).

Various examples have been described. These and other examples are within the scope of the following claims.

What is claimed is:

1. A method of controlling a plurality of aircraft in flight in a controlled airspace, the method comprising:
   establishing a connection between an integrated multi-mode automation (IMMA) system and an existing air traffic control system via an air traffic control interface, the IMMA system including a computer-readable storage device and one or more processors, the one or more processors configured to execute instructions stored on the computer-readable storage device, the instructions, when executed by the one or more processors, providing one or more trajectory-based flight management modes not supported by the existing air traffic control system;
   receiving, by the IMMA system, air traffic data associated with two or more aircraft concurrently in flight in the controlled airspace;
   determining, by the IMMA system and for each of the two or more aircraft concurrently in flight in the controlled airspace, flight management capabilities of the respective aircraft, wherein determining includes identifying, for each respective aircraft, one or more trajectory-based flight management modes supported by the respective aircraft;
   selecting, by the IMMA system, based at least in part on rules applied to the air traffic data associated with each aircraft, a trajectory-based flight management mode for each of the two or more aircraft, wherein the trajectory-based flight management mode selected for each aircraft is supported by the respective aircraft, wherein the trajectory-based flight management mode selected for at least one of the aircraft is one of the one or more trajectory-based flight management modes provided by the IMMA system but not supported by the existing air traffic control system;
   notifying the existing air traffic control system, via the air traffic control interface, of the trajectory-based flight management mode selected for each of the two or more aircraft; and
   transmitting, from the IMMA system to each of the two or more aircraft, a request that each respective aircraft enter the trajectory-based flight management mode selected by the IMMA system for the respective aircraft.

2. The method of claim 1, wherein selecting the trajectory-based flight management mode based at least in part on the rules applied to the data associated each aircraft includes:
   determining, based on the air traffic control information received from each aircraft, whether any of the aircraft are currently in one of the trajectory-based flight management modes; and
   selecting the trajectory-based flight management mode for at least one aircraft based on whether any of the aircraft are currently in one of the trajectory-based flight management modes.

3. The method of claim 2, wherein selecting the trajectory-based flight management mode for at least one aircraft is further based at least in part on the flight operation mode capabilities of another aircraft.

4. The method of claim 1, wherein determining flight management capabilities of the respective aircraft includes providing initial clearance to each aircraft, monitoring compliance of each aircraft with its assigned operating mode, and responding to any deviations from compliance.

5. The method of claim 1, wherein the trajectory-based flight management modes provided by the IMMA system but not supported by the existing air traffic control system include one or more of a Speed and Path mode, a Required Time of Arrival (RTA) mode, and a Flight Interval Management (FIM) mode.

6. The method of claim 1, wherein notifying the existing air traffic control system of the trajectory-based flight management mode selected for each of the two or more aircraft includes transmitting information to the existing air traffic control system indicative of why each mode was selected.

7. The method of claim 1, wherein notifying the existing air traffic control system, via the air traffic control interface, of the trajectory-based flight management mode selected for each of the two or more aircraft includes providing an option for user override by the air traffic controller of one or more of the trajectory-based flight management modes selected by the IMMA system for the respective aircraft.

8. The method of claim 1, wherein selecting the trajectory-based flight management modes to be used for the two or more aircraft is further based at least in part on weather conditions.

9. The method of claim 1, wherein the rules include rules for selecting a Speed and Path mode for at least one of the two or more aircraft based at least in part on detecting inclement weather in the controlled airspace.

10. The method of claim 1, further comprising monitoring, with the IMMA system, compliance of at least one aircraft with the trajectory-based flight management mode selected by the IMMA system for the respective aircraft.

11. The method of claim 10, wherein selecting a trajectory-based flight management mode for each of the two or more aircraft includes selecting a first selected trajectory-based flight management mode for a first aircraft, the method further comprising:
    detecting non-compliance of the first aircraft with the first trajectory-based flight management mode;
    selecting, by the IMMA system and from among the trajectory-based flight management modes, a second trajectory-based flight management mode, wherein the second selected trajectory-based flight management mode is different from the first selected trajectory-based flight management mode; and
    transmitting, from the IMMA system to the first aircraft, a request that the first aircraft enter the second trajectory-based flight management mode.

12. The method of claim 11, wherein the first selected trajectory-based flight management mode is a Required Time of Arrival (RTA) mode or a Flight Interval Management (FIM) mode, and the second selected trajectory-based flight management mode is a Speed and Path mode.

13. The method of claim 1, wherein the air traffic data includes one or more of flight data, schedule data, or controller inputs.

14. The method of claim 1, further comprising, prior to selecting the respective trajectory-based flight management mode for the at least one respective aircraft, assigning a scheduled time of arrival (STA) at a designated metering point to the at least one respective aircraft.

15. An integrated multi-mode automation (IMMA) system comprising:
    one or more processors;
    an interface communicatively coupled to the one or more processors, wherein the interface is configured to connect to an air traffic control interface and to communicate with an air traffic control system via the air traffic control interface; and
    a computer-readable storage device communicatively coupled to the one or more processors, wherein the computer-readable storage device stores instructions that, when executed by the one or more processors, cause the one or more processors to:
        receive air traffic data associated with two or more aircraft concurrently in flight within a controlled airspace;
        determine, for each of the two or more aircraft concurrently in flight within the controlled airspace, flight management capabilities of the respective aircraft, wherein determining includes identifying, for each respective aircraft, one or more trajectory-based flight management modes supported by the respective aircraft;
        select, based at least in part on rules applied to the air traffic data associated with each aircraft, a trajectory-based flight management mode for each of the two or more aircraft, wherein the trajectory-based flight management mode selected for each aircraft is supported by the respective aircraft, wherein the trajectory-based flight management mode selected for at least one of the aircraft is one of the one or more trajectory-based flight management modes provided by the IMMA system but not supported by the existing air traffic control system;
        notify the existing air traffic control system, via the air traffic control interface, of the trajectory-based flight management mode selected for each of the two or more aircraft; and
        transmit, to each of the two or more aircraft, a request that each respective aircraft enter the trajectory-based flight management mode selected by the IMMA system for the respective aircraft.

16. The system of claim 15, wherein the trajectory-based flight management modes provided by the IMMA system include one or more trajectory-based flight management modes selected from a group of modes comprising a Speed and Path mode, a Required Time of Arrival (RTA) mode, and a Flight Interval Management (FIM) mode, and wherein the air traffic data associated with each aircraft in flight comprises a respective indication of capabilities for one or more of the trajectory-based flight management modes for each of the aircraft, and
    wherein instructions stored by the computer-readable storage device, when executed by the one or more processors, further cause the one or more processors to select the respective trajectory-based flight management mode for each of the aircraft in flight based at least in part on the respective indication of capabilities for one or more of the trajectory-based flight management modes for the at least one respective aircraft and based at least in part on current weather conditions.

17. The system of claim 15, wherein selecting a trajectory-based flight management mode for each of the two or more aircraft includes selecting a first selected trajectory-based flight management mode for a first aircraft, and
    wherein the executable instructions further cause the one or more processors to perform operations comprising:
        detecting non-compliance of the first aircraft with the first trajectory-based flight management mode;
        selecting, by the IMMA system and from among the trajectory-based flight management modes, a second trajectory-based flight management mode, wherein the second selected trajectory-based flight management mode is different from the first selected trajectory-based flight management mode; and transmitting, from the IMMA system to the first aircraft, a request that the first aircraft enter the second trajectory-based flight management mode.

18. A non-transitory computer-readable storage medium storing instructions that, when executed, cause a computing device comprising one or more processors to perform operations comprising:

receiving air traffic data associated with two or more aircraft concurrently in flight in an airspace controlled, at least in part, by an existing air traffric control system;

determining, for each of the two or more aircraft concurrently in flight in the controlled airspace, flight management capabilities of the respective aircraft, wherein determining includes identifying, for each respective aircraft, one or more trajectory-based flight management modes supported by the respective aircraft;

selecting, based at least in part on rules applied to the air traffic data associated with each aircraft, a trajectory-based flight management mode for each of the two or more aircraft, wherein the trajectory-based flight management mode selected for each aircraft is supported by the respective aircraft, wherein the trajectory-based flight management mode selected for at least one of the aircraft is one of the one or more trajectory-based flight management modes not supported by the existing air traffic control system;

notifying the existing air traffic control system, via the air traffic control interface, of the trajectory-based flight management mode selected for each of the two or more aircraft; and transmitting, to each of the two or more aircraft, a request that each respective aircraft enter the trajectory-based flight management mode selected for the respective aircraft.

19. The non-transitory computer-readable storage medium of claim 18, wherein selecting the trajectory-based flight management mode for each of the two or more aircraft includes selecting a trajectory-based flight management mode from a group of modes including a Speed and Path mode, a Required Time of Arrival (RTA) mode, and a Flight Interval Management (FIM) mode, and wherein the air traffic data associated with the one or more aircraft in flight includes a respective indication of capabilities for one or more of the flight operation modes for each of the aircraft, and wherein the operations further comprise selecting the respective trajectory-based flight management mode for each of the aircraft in flight based at least in part on the respective indication of capabilities for one or more of the trajectory-based flight management modes for the at least one respective aircraft, and based at least in part on at least one of: current weather conditions, or the trajectory-based flight management mode capabilities of other aircraft among the aircraft in flight.

20. The non-transitory computer-readable storage medium of claim 18, wherein the respective trajectory-based flight management mode selected for the particular aircraft is a first selected trajectory-based flight management mode, and wherein the executable instructions further cause the one or more processors to perform operations comprising:

detecting non-compliance of a particular aircraft, from among the aircraft in flight, with the first selected trajectory-based flight management mode for the particular aircraft;

selecting a second trajectory-based flight management mode for the particular aircraft from among the trajectory-based flight management modes, wherein the second selected trajectory-based flight management mode is different from the first selected trajectory-based flight management mode; and outputting an indication of the second selected trajectory-based flight management mode for transmission to the particular aircraft.

* * * * *